US012665861B2

(12) United States Patent
Crider et al.

(10) Patent No.: US 12,665,861 B2
(45) Date of Patent: Jun. 23, 2026

(54) MANAGING DISTRIBUTION OF RESOURCES ACROSS SYSTEMS

(71) Applicant: Amazon Technologies, Inc., Seattle, WA (US)

(72) Inventors: Anthony Crider, Broomfield, CO (US); David Mozealous, Golden, CO (US)

(73) Assignee: Amazon Technologies, Inc., Seattle, WA (US)

( * ) Notice: Subject to any disclaimer, the term of this patent is extended or adjusted under 35 U.S.C. 154(b) by 100 days.

(21) Appl. No.: 18/896,649

(22) Filed: Sep. 25, 2024

(65) Prior Publication Data

US 2026/0089122 A1     Mar. 26, 2026

(51) Int. Cl.
*H04L 47/70*        (2022.01)
*H04L 47/78*        (2022.01)

(52) U.S. Cl.
CPC .......... *H04L 47/826* (2013.01); *H04L 47/781* (2013.01)

(58) Field of Classification Search
None
See application file for complete search history.

(56)                 References Cited

U.S. PATENT DOCUMENTS

| | | | | |
|---|---|---|---|---|
| 9,098,333 | B1 * | 8/2015 | Obrecht .................... | G06F 9/50 |
| 11,615,128 | B1 * | 3/2023 | Sanio .................... | G06F 16/182 |
| | | | | 707/738 |
| 2014/0082175 | A1 * | 3/2014 | Nadathur ................ | H04L 49/90 |
| | | | | 709/224 |
| 2015/0294377 | A1 * | 10/2015 | Chow ...................... | G06F 21/57 |
| | | | | 705/347 |
| 2020/0019634 | A1 * | 1/2020 | Poirel ........................ | G06F 7/14 |
| 2020/0019874 | A1 * | 1/2020 | Poirel ...................... | G06N 7/01 |
| 2022/0078797 | A1 * | 3/2022 | Helms ........................ | G06F 3/02 |
| 2023/0155820 | A1 * | 5/2023 | Wang ...................... | H04L 9/085 |
| | | | | 713/180 |
| 2023/0171091 | A1 * | 6/2023 | Wang ...................... | H04L 9/085 |
| | | | | 713/168 |
| 2023/0171269 | A1 * | 6/2023 | Rajasekharan ..... | H04L 63/1416 |
| | | | | 726/23 |
| 2023/0418671 | A1 * | 12/2023 | Chen ........................ | G06F 9/505 |
| 2024/0022392 | A1 * | 1/2024 | Wang ...................... | H04L 9/008 |
| 2024/0070040 | A1 * | 2/2024 | Viswanath .......... | G06F 11/2221 |
| 2024/0143840 | A1 * | 5/2024 | Wang .................. | G06F 21/6254 |

* cited by examiner

*Primary Examiner* — Phyllis A Book
(74) *Attorney, Agent, or Firm* — Davis Wright Tremaine LLP

(57)        ABSTRACT

Systems and methods are described that relate to managing independent systems that distribute a resource to multiple groups. In some examples, parameters control the number of distributions executed to the groups. Based, at least in part, on the number of distributions made to the groups from the systems, the distribution of the resource is throttled.

20 Claims, 8 Drawing Sheets

400

| | DEMAND-SIDE ENTITY 311 | RESOURCE 312 | GROUP #1 313 | GROUP #1 DEVICE #2 314 | GROUP #2 DEVICE #1 315 | GROUP #2 DEVICE #2 316 | GROUP #2 DEVICE #3 317 |
|---|---|---|---|---|---|---|---|
| MEMBER #1 321 | 7 | 7 | 5 | 1 | 2 | 0 | 0 |
| MEMBER #2 322 | 3 | 3 | 1 | 0 | 0 | 0 | 2 |
| MEMBER #3 323 | 4 | 4 | 1 | 0 | 2 | 1 | 1 |
| MEMBER #4 324 | 2 | 2 | 0 | 0 | 0 | 0 | 2 |
| MEMBER #5 325 | 2 | 2 | 1 | 0 | 1 | 0 | 0 |

FIG. 3

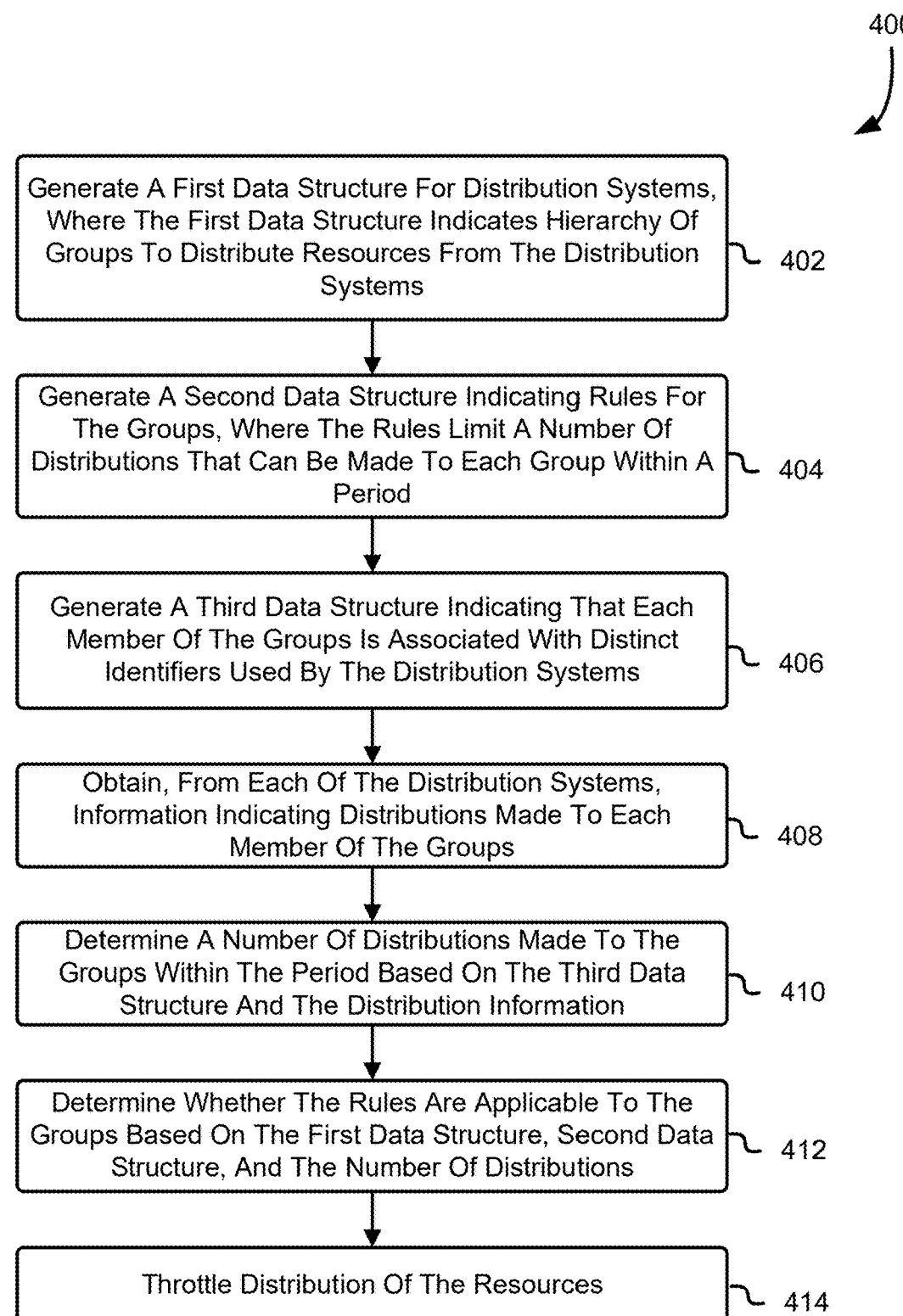

400

Generate A First Data Structure For Distribution Systems, Where The First Data Structure Indicates Hierarchy Of Groups To Distribute Resources From The Distribution Systems          402

Generate A Second Data Structure Indicating Rules For The Groups, Where The Rules Limit A Number Of Distributions That Can Be Made To Each Group Within A Period          404

Generate A Third Data Structure Indicating That Each Member Of The Groups Is Associated With Distinct Identifiers Used By The Distribution Systems          406

Obtain, From Each Of The Distribution Systems, Information Indicating Distributions Made To Each Member Of The Groups          408

Determine A Number Of Distributions Made To The Groups Within The Period Based On The Third Data Structure And The Distribution Information          410

Determine Whether The Rules Are Applicable To The Groups Based On The First Data Structure, Second Data Structure, And The Number Of Distributions          412

Throttle Distribution Of The Resources          414

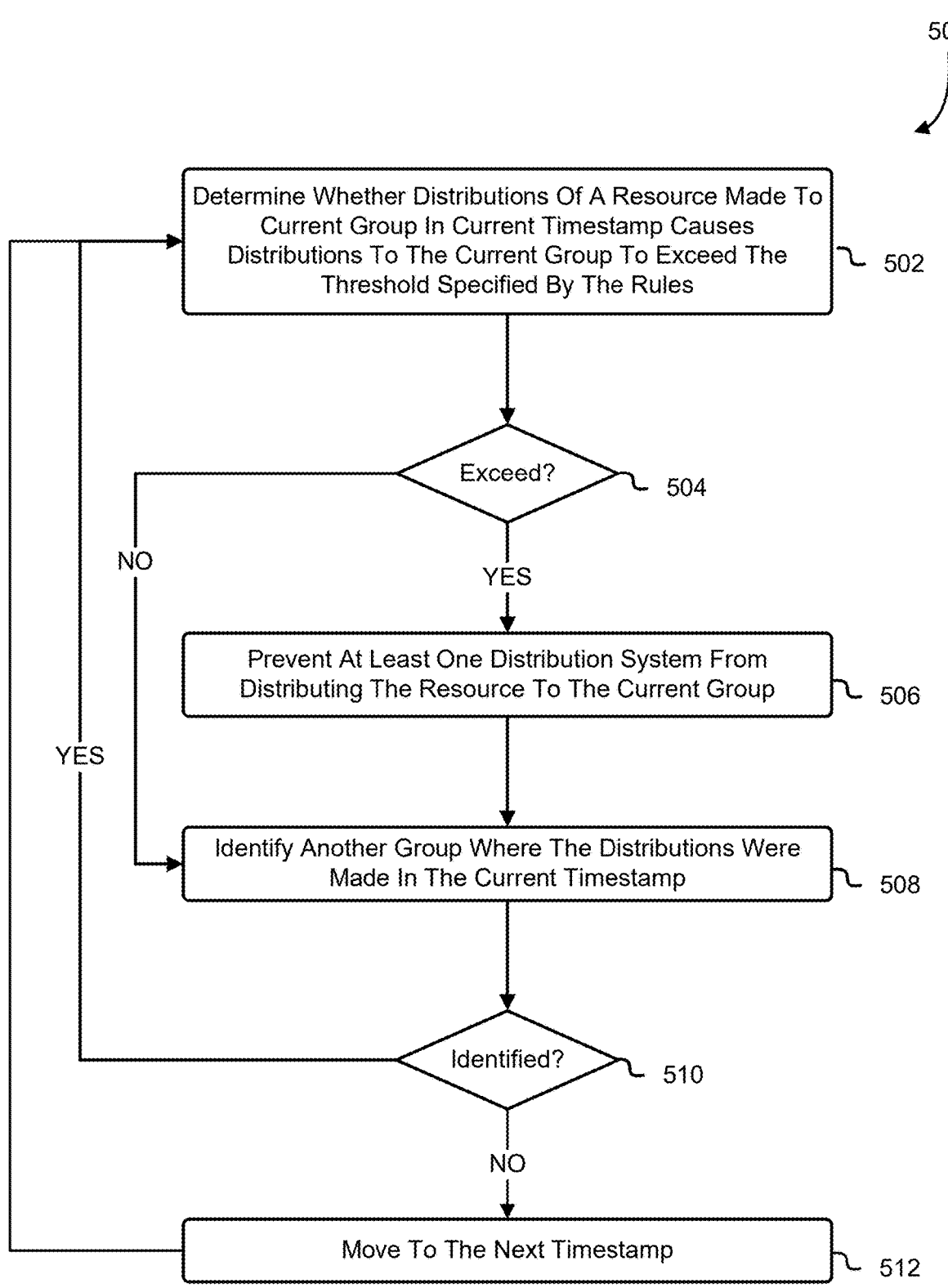

Determine Whether Distributions Of A Resource Made To Current Group In Current Timestamp Causes Distributions To The Current Group To Exceed The Threshold Specified By The Rules　502

Exceed?　504

NO

YES

Prevent At Least One Distribution System From Distributing The Resource To The Current Group　506

Identify Another Group Where The Distributions Were Made In The Current Timestamp　508

Identified?　510

YES

NO

Move To The Next Timestamp　512

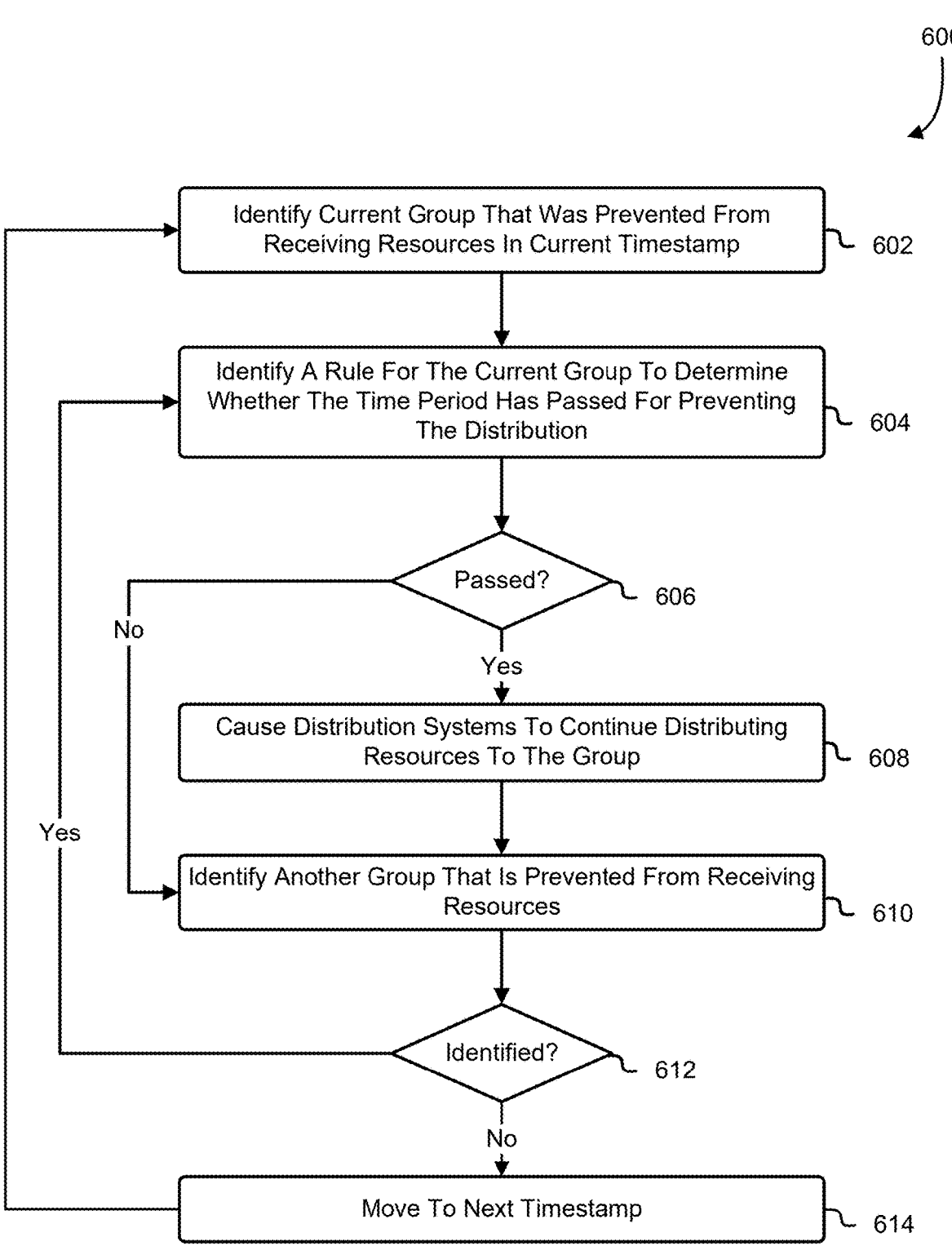

Identify Current Group That Was Prevented From Receiving Resources In Current Timestamp — 602

Identify A Rule For The Current Group To Determine Whether The Time Period Has Passed For Preventing The Distribution — 604

Passed? — 606

No

Yes

Cause Distribution Systems To Continue Distributing Resources To The Group — 608

Yes

Identify Another Group That Is Prevented From Receiving Resources — 610

Identified? — 612

No

Move To Next Timestamp — 614

Application
Server(s)

706

Web
Server(s)

708

Production

Log

User
Information

710

712

714

716

MANAGING DISTRIBUTION OF RESOURCES ACROSS SYSTEMS

BACKGROUND

Users frequently receive the same resources multiple times due to the independent operation of various resource distribution systems. These systems often lack coordination because privacy concerns prevent them from sharing user identity information, leading to redundant resource delivery to the same user. This results in waste of computing resources, increased network traffic, and inefficient utilization of data processing capabilities.

BRIEF DESCRIPTION OF THE DRAWINGS

Various techniques will be described with reference to the drawings, in which:

FIG. 3 illustrates another example data structure indicating distribution information from distribution systems, in accordance with at least one embodiment;

FIG. 4 illustrates an example process to execute global frequency capping of multiple systems, in accordance with at least one embodiment;

FIG. 5 illustrates an example process to prevent distribution of resources, in accordance with at least one embodiment;

FIG. 6 illustrates an example process to resume distribution of resources, in accordance with at least one embodiment.

DETAILED DESCRIPTION

Figure 1A:
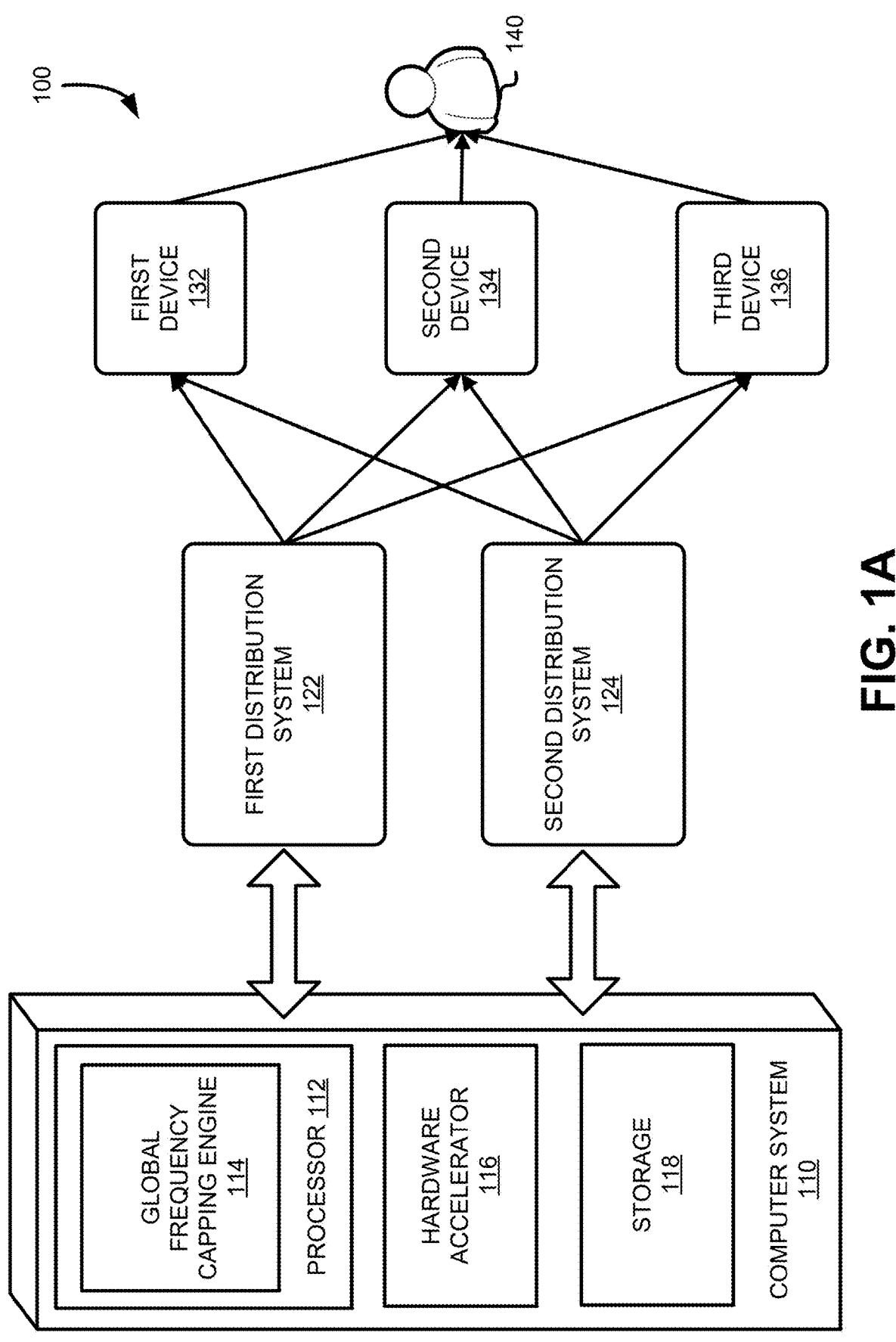
FIG. 1A illustrates a schematic diagram including an example system that executes global frequency capping of multiple systems, according to at least one embodiment.

Systems and methods are described herein for applying global frequency capping for resources. Demand-side entities (e.g., advertisers) may interact with multiple distribution systems (e.g., DSP) to distribute resources (e.g., advertisements, campaigns, communications) to users across various devices (e.g., laptops, desktops, mobile devices).

In some examples, a system may manage multiple distribution systems by preventing them from distributing resources if certain thresholds are exceeded. This system can either be separate from or part of the distribution systems. To manage resource distributions, the system may create a mapping between various target groups defined by the distribution systems, indicating a hierarchy. For example, one target group might be a specific audience (e.g., people with kids), while another might be a combination of a device type and the audience (e.g., people with kids using laptops). The system may generate rules to regulate the number of distributions per target group or users within a given time period.

In various examples, the system may receive distribution data from multiple distribution systems, including distributions to individuals within target groups (e.g., distributions sent to Susan via laptop). It may generate mappings to clarify relationships between different identities used by the distribution systems, identifying distinct identities (e.g., FirstSusan, SecondSusan) that represent the same individual (e.g., Susan). Using these mappings, the system can determine the number of distributions made per group.

In other examples, the system may determine if the number of distributions per group within a time period violates any rules. An individual may belong to multiple groups, and distributions to these groups may breach the rules. If a violation occurs, the system may instruct the relevant distribution systems to stop distributions for a specified period. The distribution systems can resume distributing resources once this period has passed, with the duration varying by group type.

In some examples, the system may receive specific user data from distribution systems to distribute resources on their behalf based on rules. It may implement safety measures like SSL and TLS to protect data in transit. Additionally, the system may follow strict data governance policies aligned with privacy regulations such as GDPR and CCPA, limiting access to sensitive information and ensuring compliance. User consent mechanisms, like opt-in preferences, may be implemented to give users control over data sharing. The system may also use logs, decentralized systems (e.g., blockchain), directed acyclic graphs, etc. to store and verify private information (e.g., identities used by different distribution systems) to ensure privacy.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) reducing memory requirements by at least preventing overdistribution of resources, (2) reducing network latencies by at least controlling distribution of resources to devices, (3) improving security of identities used by different systems, (4) enhanced privacy by allowing frequency capping without sharing user identities between systems, and (5) more efficient utilization of computing resources across multiple distribution systems.

FIG. 1 illustrates an example system 100 that executes global frequency capping of multiple systems, according to at least one embodiment. System 100 may include computer system 102, first distribution system 122, second distribution system 124, first device 132, second device 134, third device 136, and member 140. In at least one embodiment, system 100 may refer to one or more of the software and hardware described herein to perform one or more techniques described in conjunction with FIGS. 1-6 to execute frequency capping over multiple distribution systems (e.g., first distribution system 122, second distribution system 124).

In various examples, terms such as "software" described herein may include one or more of the following: operating systems, device drivers, application software, database software, graphics software, web browsers, development software (e.g., integrated development environments, code editors, compilers, interpreters), network software, simulation software, real-time operating systems (RTOS), artificial intelligence software, robotics software, firmware (e.g., BIOS/UEFI, router, smartphone, consumer electronics, embedded systems, printer, solid state drive (SSD)), APIs, containerized software, container orchestration platforms, algorithms, instructions, and any other implementation embedded as a software package, code, and/or instruction set.

Additionally, terms such as "hardware" described herein may include one or more of the following: central processing units (CPU), integrated circuits (IC), systems on-chip (SoC), graphics processing units (GPU), data processing units (DPU), digital signal processors, tensor processing units (TPU), accelerated processing units (APU), application-specific integrated circuits (ASIC), intelligent processing units (IPU), neural processing units (NPU), smart network interface controllers (SmartNIC), vision processing units (VPU), field-programmable gate arrays (FPGA), hardwired circuitry, programmable circuitry, state machine circuitry, fixed function circuitry, execution unit circuitry, and/or firmware that stores instructions executed by programmable circuitry.

In at least one embodiment, computer system 102 can be part of a cloud computing environment that provides the infrastructure for executing global frequency capping described herein. The cloud computing environment may provide virtualized computing resources to enable computer system 102 to perform various tasks for global frequency capping, such as process 400 illustrated in FIG. 4, process 500 illustrated in FIG. 5, process 600 illustrated in FIG. 6, and any other general tasks such as data processing, storage, and network communication. These virtualized resources allow computer system 102 to adjust its computational capabilities based on demand (e.g., increase or decrease in the number of distributions of one or more resources).

The cloud computing environment may deploy one or more virtual machine (VM) instances, which system 102 can use to execute its processes (e.g., process 400 illustrated in FIG. 4, process 500 illustrated in FIG. 5, process 600 illustrated in FIG. 6). The cloud computing environment may provision and manage these VM instances, which allows system 102 to scale its processing power according to workload requirements. The system may automatically increase or decrease the number of active VM instances based on these requirements. Additionally, the cloud computing environment may include load balancing capabilities that distribute incoming network traffic across multiple VM instances. System 102 can use this load balancing to prevent any single VM instance from becoming overloaded, maintaining an even distribution of workloads. In some examples, computer system 102 can be one of the one or more VM instances deployed by the cloud computing environment.

The cloud computing environment may include load balancing capabilities that distribute incoming network traffic across multiple VM instances. The cloud computing environment also includes an auto-scaling feature that adjusts the number of VM instances based on predefined performance metrics, such as CPU utilization or network traffic volume.

The cloud computing environment may provide, to computer system 102, object-based storage to manage large datasets, including various information usable for cross-system frequency capping. Computer system 102 can access and store data using this cloud-based storage. Data generated by any of the VM instances and/or computer system 102 as a result of performing cross-system frequency capping can be modified, stored, and moved by the cloud computing environment's data replication and synchronization services to ensure data consistency and availability. For example, the data replication and synchronization services can replicate data across multiple geographic locations.

In some examples, computer system 102 may use the cloud computing environment's security and access management services. These services allow computer system 102 to define and enforce roles and permissions that govern user (e.g., member 140) and service (e.g., secure data collaboration service described herein) interactions with computer system 102.

In at least one embodiment, computer system 102 may include or use a secure data collaboration service provided by the cloud computing environment. The secure data collaboration service may allow multiple parties (e.g., computer system 102, first distribution system 122, second distribution system 124, etc.) to collaborate on data analysis within a secure, controlled environment. The secure data collaboration service may enable one or more participants (e.g., computer system 102, first distribution system 122, second distribution system 124, etc.) to contribute their datasets to a centralized location where the data can be queried and analyzed according to specific rules set by the one or more participants. The secure data collaboration service may enforce strict access controls, ensuring that the one or more participants can only access the analysis results permitted by these predefined rules.

Additionally, the secure data collaboration service may allow the one or more participants to manage access to their data through fine-grained permissions, which may define who can view, query, and analyze the data, as well as under what conditions these actions can take place. The secure data collaboration service may allow logging and auditing, which can track all actions taken within the environment. The secure data collaboration service may perform compliance checks to ensure that all data analysis adheres to regulatory and contractual obligations.

Also, the secure data collaboration service may provide use of hardware-based Trusted Execution Environments (TEEs), which can provide an extra layer of security by ensuring that data remains encrypted and isolated during processing. This feature can allow system 102 to execute data analysis tasks within a secure enclave to prevent unauthorized access to the data even during computation (e.g., using distribution data from each distribution system to identify a number of distributions for each group or member or any other steps to perform global frequency capping). The secure data collaboration service may provide a tamper-evident ledger for storing and tracking data. This ledger may ensure that any modifications or access attempts are fully traceable and cannot be altered or deleted.

Figure 2:
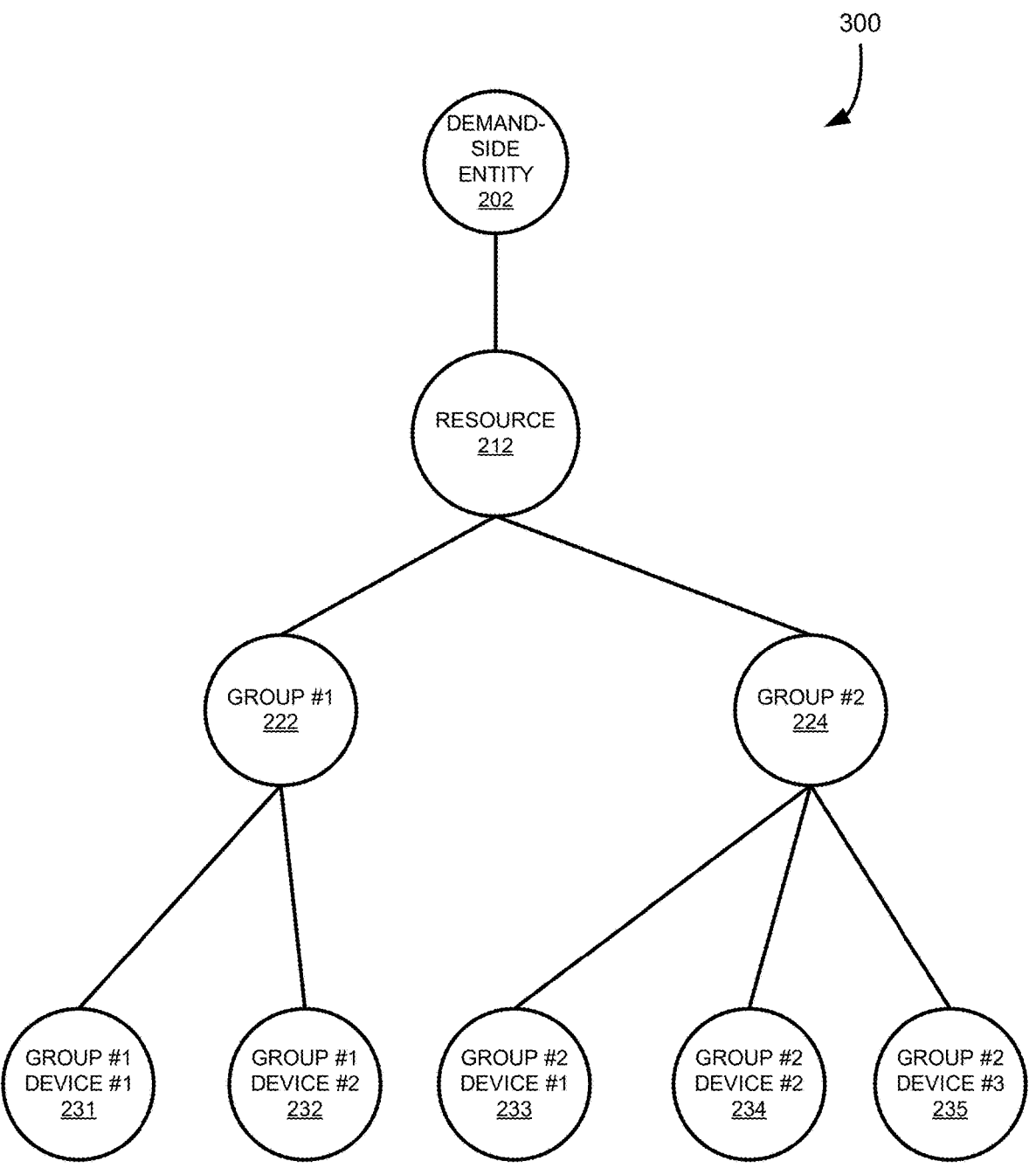
FIG. 2 illustrates an example data structure indicating a scheme for distribution systems to distribute resources to groups, according to at least one embodiment.

By utilizing the secure collaboration service, computer system 102 may not only perform the cross-system frequency capping described herein but also act as a global distribution system that generates distribution strategies and identities for different distribution systems (e.g., first distribution system 122, second distribution system 124) described herein and performs distribution to devices (e.g., first device 132, second device 134, third device 136), groups (demand-side entity 202, resource 212, group #1 222, group #1 & device #1 231, group #1 & device #2 232, group #2 & device #1 233, group #2 device #2 234, group #2 device #3 235 illustrated in FIG. 2), or members (e.g., member 140) on behalf of the different distribution systems while ensuring privacy (e.g., complying with privacy laws in various jurisdictions).

In at least one embodiment, computer system 102 may include processor 112, hardware accelerator 116, and storage 118. Processor 112 may refer to a central unit within a system (e.g., computer system 102) that can execute instructions and perform calculations necessary to run software and process data, which can be used for global frequency capping described herein. Processor 112 may include one or more CPUs. Processor 112 may also include a global frequency capping engine 114. In some examples, computer system 102 can be one of distribution systems separate from first distribution 122 or second distribution system 124.

In at least one embodiment, global frequency capping engine 114 may refer to a module that executes one or more processes (e.g., process 400 illustrated in FIG. 4, process 500 illustrated in FIG. 5, process 600 illustrated in FIG. 6) by using one or more data structures (e.g., data structure 200 illustrated in FIG. 2, data structure 300 illustrated in FIG. 3) to perform cross-system frequency capping. As used in any implementation described herein, unless otherwise clear from context or stated explicitly to the contrary, terms such as "module" and nominalized verbs (e.g., global frequency capping engine 114) illustrated in at least FIG. 1 each refer to any combination of software logic, hardware logic, and/or circuitry configured to provide specific functionality.

In at least one embodiment, global frequency capping engine 114 may generate a mapping (e.g., data structure 200 illustrated in FIG. 2) between different groups that one or more distribution systems (e.g., first distribution system 122, second distribution system 124) target. The different groups can be defined based, at least in part, on one or more resources that the distribution systems distribute. Examples of the different groups are further described herein. Each distribution system can send its own definition of the groups to target, and the mapping is generated based on what they send. The mappings can include a hierarchy of different groups. For example, some groups with a higher hierarchy may include a demand-side entity (e.g., advertiser), type of resource, and audiences (e.g., adults who have kids) that the distribution systems define based on the type of resource. In other examples, other groups with a lower hierarchy may include subsets of the audiences (e.g., adults who have kids and use mobile devices, adults who have kids and use desktops). In other examples, global frequency capping engine 114 receives grouping information from the one or more distribution systems and consolidate the information to generate the mapping. Global frequency capping engine 114 may identify similar groups defined by the one or more distribution systems and map them to indicate one or more relationships.

In at least one embodiment, global frequency capping engine 114 may generate one or more rules, parameters, limitations, constraints, thresholds, caps, ceilings, policies, quotas, restrictions, or any other bounds to restrict the number of distributions, deliveries, allocations, emissions, dispatches, transfers, transmissions, provisions, releases, or any other transactions made or executed to each group from the distribution systems (e.g., first distribution system 122, second distribution system 124). The one or more rules may include one or more time periods to count the number of distributions. In one example, the one or more rules restrict the distribution systems to distribute a resource to Group A no more than five times per week. Additionally, the one or more rules may include one or more additional time periods to block the distribution from the distribution systems. For instance, the one or more rules may indicate that distribution of the resource to Group A is limited for three days if the resource is distributed to Group A five or more times per week.

In at least one embodiment, global frequency capping engine 114 may receive or generate mappings between identities that are used by the one or more distribution systems. Each distribution system may use different identifiers to indicate the same user. For example, first distribution system 122 may use FirstOdin and second distribution system 124 may use SecondOdin to identify the same person who is identified or indicated as Odin. Additional examples of the mappings between identities are further described in conjunction with FIG. 3. In some examples, the identities are consistent with the guidelines established for identifier for advertising.

In at least one embodiment, identities can be verified by using various auditing mechanisms such as, for example, directed acyclic graph, distributed ledgers (e.g., blockchain), hash-based verification, public-key infrastructure, API gateway, tokenization, security assertion markup language, role-based access control audits, consensus algorithms, etc. In some examples, identifiers can be obtained by using one or more APIs. In at least one embodiment, global frequency capping engine 114 may receive distribution information from the one or more distribution systems. Distribution information may indicate how the one or more distribution systems distribute the one or more devices to the one or more members (e.g., member 140) via one or more devices (e.g., first device 132, second device 134, third device 136, etc.). For example, the distribution information may indicate that a resource is distributed to member 140 via first device 132. Examples of the distribution information are further described in conjunction with FIG. 3.

In at least one embodiment, global frequency capping engine 114 may determine distributions made to each group of the different groups based on the distribution system. The determination can be done for each timestamp, and global frequency capping engine 114 may store prior distribution data to count the number of distributions. Global frequency capping engine 114 may determine that any of the distributions to the one or more members (e.g., member 140) violated the one or more rules and send indications to the one or more distribution systems such that they can impose the restrictions indicated by the one or more rules. As a result, the one or more distribution systems are prevented from distributing the one or more resources to the one or more members via the one or more devices. In some examples, global frequency capping engine 114 can perform one or more blocks of process 400 illustrated in FIG. 4, process 500 illustrated in FIG. 5., or process 600 illustrated in FIG. 6.

In at least one embodiment, hardware accelerator 116 may refer to a specialized processing unit designed to perform specific computational tasks (e.g., one or more tasks to perform global frequency capping) more efficiently than processor 112. Hardware accelerator 116 may include one or more of a GPU, DPU, digital signal processor, TPU, APU, ASIC, IPU, NPU, SmartNIC, VPU, or FPGA. Hardware accelerator 116 may receive one or more instructions to perform one or more tasks (e.g., one or more blocks of process 400 illustrated in FIG. 4, process 500 illustrated in FIG. 5, process 600 illustrated in FIG. 6).

In some examples, hardware accelerator 116 can be used to perform neural network training and/or inferencing to perform tasks (e.g., identifying the number of distributions made to one or more groups, determining whether the number of distributions should be limited based on frequency capping, identifying different identities from distribution systems that correspond to the same member, etc.) for global frequency capping engine 114. The neural networks may include, for example, convolutional neural networks (CNNs), recurrent neural networks (RNNs), long short-term memory (LSTM) networks, generative adversarial networks (GANs), autoencoders, transformer networks (e.g., bidirectional encoder representations from transformers (BERT), generative pre-trained transformer (GPT), text-to-text transfer transformer (T5), vision transformers (VIT), XLNet, etc.), feedforward neural networks, etc.

In at least one embodiment, storage 118 may refer to one or more hardware and software components described herein to store, retrieve, and manage data, allowing information to be saved and accessed by one or more systems (e.g., access control system 110, management system 120, request support system 130). The storage may include one or more of random access memory (RAM), read-only memory (ROM), flash memory (e.g., Universal Serial Bus (USB) flash drives, SSD, memory cards), cache memory, hard disk drives (HDDs), virtual memory, graphics memory, optical discs, network-attached storage (NAS), cloud storage, tape storage, etc. Additionally, the storage may further include one or more of relational databases, NoSQL databases, key-value stores, document-oriented databases, column-family stores, and graph databases. In addition, the storage may also include one or more of code repositories, artifact repositories, content repositories, document repositories, package repositories, etc. Furthermore, the storage may include one or more of file storage (e.g., network-attached storage (NAS), cloud storage service), block storage, object storage, cache storage, tape storage, etc.

In some examples, storage 118 may store distribution system mapping definitions provided by global frequency capping engine 114. Storage 118 may store frequency cap definitions provided by global frequency capping engine 114. Storage 118 may store identity mappings provided by global frequency capping engine 114. Storage 118 may store distribution information provided by first distribution system 122 and/or second distribution system 124. Storage 118 may store the status of each group (e.g., whether the group is restricted from distribution) or a member that is associated with the group (e.g., cap restriction of a group preventing the distribution to the member). Storage 118 may store other data that is generated as a result of global frequency capping engine 114 executing one or more operations to perform cross-system frequency capping. Storage 118 may communicate with the secure collaboration service to exchange the data.

In at least one embodiment, the one or more distribution systems (e.g., first distribution system 122, second distribution system 124) may refer to a system that enables the one or more demand-side entities (e.g., advertisers) to purchase resources (e.g., display, video, and audio) across websites and applications. The one or more distribution systems may perform audience targeting based on customer behavior and demographics. Through the one or more distribution systems, the one or more demand-side entities can utilize a variety of advertisement formats, including banner ads, video, and native ads, and engage in marketplace transactions. The one or more distribution systems may also provide tools for campaign management, offering controls over budgets, bidding strategies, and performance tracking, with integration options for third-party ad verification.

In at least one embodiment, the one or more distribution systems may provide advertisement formats such as interactive and rich media ads. The one or more distribution systems may provide control over bidding and budget allocation through optimization tools, driven by the one or more neural networks described herein. In at least one embodiment, the one or more demand-side entities may set their campaign parameters, such as target audience, budget, and bidding strategies (e.g., cost-per-click or cost-per-thousand impressions). The one or more distribution systems may act as an intermediary, using these inputs to automatically bid on relevant ad impressions in real-time auctions. When a user (e.g., member 140) visits a website or app, the demand-side entity sends an advertisement request to the advertisement exchange, which then communicates with the one or more distribution systems. The one or more distribution systems may evaluate whether the user fits the one or more demand-side entities' targeting criteria and calculate a bid based on the one or more demand-side entities' settings and bidding strategy. If the one or more distribution systems win the auction with the highest bid, the one or more distribution systems may serve the one or more demand-side entities' ad to the user. Throughout the process, the one or more distribution systems may manage the one or more demand-side entities' budget, optimize bids, and provide reporting on performance, streamlining the interaction between the one or more demand-side entities and the ad exchange ecosystem.

In at least one embodiment, devices (e.g., first device 132, second device 134, third device 136, etc.) may refer to various types of digital hardware that distribution systems target to send impressions, ensuring wide audience reach. These may include mobile phones, which allow for high engagement due to their constant usage for apps, browsing, and social media. Demand-side entities, such as companies or advertisers, can target desktop computers for more detailed activities such as work, research, or e-commerce. The demand-side entities may target tablets for providing another important touchpoint, often used for media consumption and online shopping in a portable format. The demand-side entities may target TVs and other connected devices through streaming services. The devices can be part of different groups, as further described in conjunction with FIG. 2.

In at least one embodiment, users (e.g., member 140) may refer to distinct groups of individuals that the one or more distribution systems target based on various characteristics or behaviors. These groups can include demographic segments, where users are categorized by factors such as age, gender, or income level. Interest-based groups may consist of individuals who have demonstrated preferences for specific topics or industries through their online behavior. Behavioral segments can target users based on past actions like purchase history, site visits, or content interactions. Additionally, geographic groups may focus on users in specific regions or locations. By identifying and targeting these diverse audience members, the one or more distribution systems can deliver more tailored and relevant resources. In some examples, distribution of resources can be triggered as a result of one or more user activity. The one or more user activity may include, for example, opening an application or web-browser, turning on TV or a particular channel, or interacting with video/image.

In addition, member 140 can concurrently be part of different groups. For example, member 140 can be a 30-year-old woman living in New York City who is interested in fitness and frequently purchases workout gear online. Moreover, member 140 can be part of multiple groups, including a demographic group (based on her age and gender), a geographic group (residing in New York City), and an interest-based group (focused on fitness and health). Additionally, her behavioral group may include users who have a history of purchasing fitness-related products. This allows the one or more distribution systems to target member 140 with resources (e.g., personalized advertisements) across different categories, increasing the relevance of the messaging she receives. Moreover, member 140 can use different types of devices (e.g., first device 132, second device 134, third device 136, etc.)

Figure 1B:
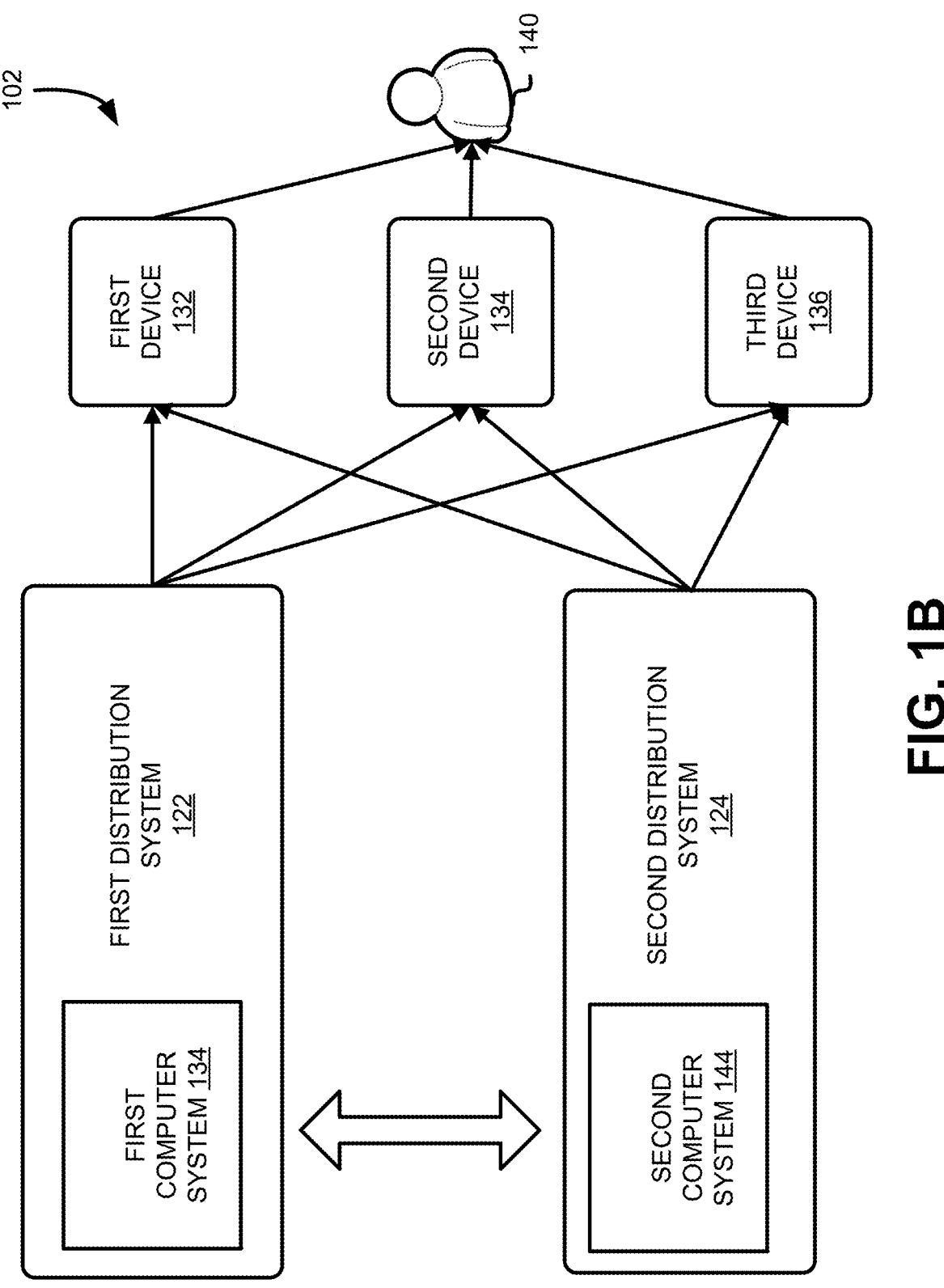
FIG. 1B illustrates another schematic diagram including an example system that executes global frequency capping of multiple systems, according to at least one embodiment.

FIG. 1B illustrates another schematic diagram including system 102 that executes global frequency capping of multiple systems, according to at least one embodiment. System 102 may include first distribution system 122, second distribution system 124, first device 132, second device 134, third device 136, and member 140.

In at least one embodiment, first distribution system 122 may include first computer system 134. In some examples, first computer system 134 may refer to a local system to first distribution system 122 to perform global frequency capping. First computer system 134 may include computer system 110.

In at least one embodiment, second distribution system 124 may include second computer system 144. In some examples, second computer system 144 may refer to a local system to second distribution system 124 to perform global frequency capping. Second computer system 144 may include computer system 110.

In at least one embodiment, first computer system 134 may coordinate and/or communicate with second computer system 144 to perform one or more blocks of process 400 illustrated in FIG. 4, process 500 illustrated in FIG. 5, or process 600 illustrated in FIG. 6.

In at least one embodiment, global frequency capping engines within first computer system 134 and second computer system 144 may generate a mapping (e.g., data structure 200 illustrated in FIG. 2) between different groups that corresponding distribution systems (e.g., first distribution system 122, second distribution system 124) target. The different groups can be defined based, at least in part, on one or more resources that the distribution systems distribute. Each distribution system can send its own definition of the groups to target, and the mapping is generated based on what they send. The mappings can include a hierarchy of different groups. For example, some groups with a higher hierarchy may include a demand-side entity (e.g., advertiser), type of resource, and audiences (e.g., adults who have kids) that the distribution systems define based on the type of resource.

In at least one embodiment, global frequency capping engines within first computer system 134 and second computer system 144 may generate one or more parameters to restrict the number of distributions made to each group. The one or more parameters may include one or more time windows to count the number of distributions.

In at least one embodiment, global frequency capping engines within first computer system 134 and second computer system 144 may receive or generate mappings between identities that are used by the one or more distribution systems. Each distribution system may use different identifiers to indicate the same user. For example, first distribution system 122 may use FirstOdin and second distribution system 124 may use SecondOdin to identify the same person who is identified or indicated as Odin.

In at least one embodiment, global frequency capping engines within first computer system 134 and second computer system 144 may receive distribution information from the one or more distribution systems. Distribution information may indicate how the one or more distribution systems distribute the one or more devices to the one or more members (e.g., member 140) via one or more devices (e.g., first device 132, second device 134, third device 136, etc.).

For example, the distribution information may indicate that a resource is distributed to member 140 via first device 132.

In at least one embodiment, global frequency capping engines within first computer system 134 and second computer system 144 may determine distributions made to each group of the different groups based on the distribution system. The determination can be done for each timestamp, and global frequency capping engines within first computer system 134 and second computer system 144 may store prior distribution data to count the number of distributions. Global frequency capping engines within first computer system 134 and second computer system 144 may determine that any of the distributions to the one or more members (e.g., member 140) violated the one or more rules and send indications to the one or more distribution systems such that they can impose the restrictions indicated by the one or more rules. As a result, the one or more distribution systems are prevented from distributing the one or more resources to the one or more members via the one or more devices.

Global frequency capping engines within first computer system 134 and second computer system 144 may communicate distribution information generated by corresponding distribution systems (e.g., first distribution system 122, second distribution system 124). In some examples, based on the distribution information, each computer system (e.g., first computer system 134, second computer system 144) may determine whether its corresponding distribution system violated the one or more parameters such that distributions of the resource to the devices are prevented.

FIG. 2 illustrates an example data structure 200 indicating a scheme for distribution systems to distribute resources to groups, according to at least one embodiment. Data structure 200 may refer to a specialized format for organizing, storing, and managing data to perform global frequency capping described in conjunction with FIGS. 1-6. Data structure 200 may include a node indicating demand-side entity 202, a node indicating resource 212, a node indicating group #1 222, a node indicating group #2 224, a node indicating device #1 of group #1 231, a node indicating device #2 of group #1 232, a node indicating device #1 of group #2 233, a node indicating device #2 of group #2 234, and a node indicating device #3 of group #2 235.

In at least one embodiment, demand-side entity 202 may refer to any individual, organization, or business that seeks to promote a product, service, or idea by purchasing space or time in various media channels to reach a targeted audience and influence consumer behavior. Resource 212 may refer to any form of media, message, or material, such as text, images, videos, or interactive experiences, that is strategically crafted and delivered through various channels to inform, engage, or influence an audience, often with the goal of driving awareness, interest, or action. Resource 212 may also refer to impressions, including a type of product that is displayed to one or more users. In some examples, resource 212 may include the one or more resources described in conjunction with FIGS. 1 and 4-6.

In various examples, groups with higher hierarchy (e.g., group #1 222, group #2 224) may refer to a set of individuals or entities that distribution systems identify, and target based on specific criteria such as demographics, interests, behaviors, or location. These systems use data-driven algorithms and insights to deliver relevant advertisements or content to the most appropriate users, optimizing engagement and conversion rates for advertisers. For example, the groups with higher hierarchy may include users who have recently searched for specific products or services online, indicating potential interest. Distribution systems (e.g., first distribution system 122, second distribution system 124 illustrated in FIG. 1) can use browsing history, past purchases, or social media activity to define these segments. Additionally, the groups with higher hierarchy may be targeted based on geographic location, so resource 212 can be shown to users in a particular city or region. Behavioral data, such as time spent on certain websites, can further refine the groups with higher hierarchy, ensuring that resource 212 reach users who are more likely to engage. Furthermore, the demand-side entities may adjust their campaigns in real-time to optimize results based on audience response.

Additionally, groups with lower hierarchy (e.g., group #1 & device #1 231, group #1 & device #2 232, group #2 & device #1 233, group #2 & device #2 234, group #2 & device #3 235, etc.) may refer to portions of the groups with higher hierarchy that are defined based on the type of devices. This can be to cover targeting subgroups across a range of devices, ensuring broader reach and higher engagement. For instance, distribution systems may focus on mobile devices, where users are frequently active on apps and social media platforms. Demand-side entity 202 can also target desktop users, who may spend more time researching and comparing products. Tablets may be another valuable device category, often used for multimedia consumption and e-commerce activities. Additionally, connected devices such as TVs can allow demand-side entity 202 to reach users through streaming services. In some examples, group #1 & device #1 231 can be a subgroup of group #1 222 that receives resource 212 via device #1 (e.g., mobile devices); group #1 & device #2 232 can be a subgroup of group #1 222 that receives resource 212 via device #2 (e.g., TV); group #2 & device #1 233 can be a subgroup of group #2 224 that receives resource 212 via device #1 (e.g., mobile devices); group #2 & device #2 234 can be a subgroup of group #2 224 that receives resource 212 via device #2 (e.g., TV); and group #2 & device #3 235 can be a subgroup of group #2 224 that receives resource 212 via device #3 (e.g., laptop).

As a result of using data structure 200, systems (e.g., computer system 110, the distribution systems, cloud computing environment) can perform at least identifying two or more groups to obtain a resource, the resource to be provided by two or more systems; identifying one or more rules to restrict a number of times the resource is distributed to at least one of the two or more groups; obtaining, from at least one the two or more groups, information indicating one or more distributions of the resource made to two or more groups, the two or more groups comprising one or more members; identifying a mapping between two or more identifiers that correspond to the two or more systems, the two or more identifiers at least indicating the one or more members; and determining a number of distributions made to the two or more groups based, at least in part, on the information and the mapping; determining that the number of distributions made to the two or more groups violates the one or more rules; and based on determining that the number of distributions made to the two or more groups violates the one or more rules, preventing the two or more systems from distributing the resource to the two or more.

In various examples, data structure 200 may apply to multiple distribution systems (e.g., first distribution system 122, second distribution system 124). Data structure 200 may apply to a subset of distribution systems but not others (e.g., applicable to two of three distribution systems but not applicable to the remaining distribution system). In other examples, there can be different versions of data structure 200 that are applicable to different distribution systems.

In at least one embodiment, each distribution system (e.g., first distribution system 122 and second distribution system 124 illustrated in FIG. 1) may correspond to a different data structure, such as data structure 200. In some examples, local computer systems of one or more distribution systems (e.g., first computer system 134 and second computer system 144 illustrated in FIG. 1) may generate different data structures.

FIG. 3 illustrates an example data structure 300 that indicates distribution information from distribution systems, in accordance with at least one embodiment. Management systems (e.g., computer system 110 illustrated in FIG. 1) may receive, from one or more distribution systems (e.g., first distribution system 122 and second distribution system 124 illustrated in FIG. 1), distribution information on how the distribution systems distributed one or more resources to one or more users (e.g., member 140 illustrated in FIG. 1) via one or more devices (e.g., first device 132, second device 134, and third device 136 illustrated in FIG. 1). One example of the distribution information (e.g., impression log fragments) for a first distribution system can be:

```
{user="FirstMember#1", timestamp = "1000", line "8971"}
{user="FirstMember#1", timestamp = "1010", line "8971"}
{user="FirstMember#3", timestamp = "1015", line "9134"}
{user="FirstMember#3", timestamp = "1020", line "1834"}
{user="FirstMember#4", timestamp = "1020", line "9481"}
{user="FirstMember#4", timestamp = "1025", line "9481"}
{user="FirstMember#1", timestamp = "1035", line "8971"}
{user="FirstMember#2", timestamp = "1040", line "9481"}
{user="FirstMember#1", timestamp = "1050", line "8971"}
```

Another example of the distribution information (e.g., impression log fragments) for a second distribution system can be:

```
{user="SecondMember#3", timestamp = "1005", line "7518"}
{user="SecondMember#2", timestamp = "1015", line "7518"}
{user="SecondMember#1", timestamp = "1020", line "4817"}
{user="SecondMember#1", timestamp = "1025", line "8871"}
{user="SecondMember#5", timestamp = "1025", line "4817"}
{user="SecondMember#5", timestamp = "1030", line "8871"}
{user="SecondMember#3", timestamp = "1030", line "3541"}
{user="SecondMember#1", timestamp = "1040", line "1990"}
{user="SecondMember#2", timestamp = "1050", line "3541"}
{user="SecondMember#1", timestamp = "1060", line "8871"}
```

In some examples, the user portion (e.g., user="SecondMember #3") can indicate identifiers that represent the identity of the user used by each distribution system, where the identifiers are different for each distribution system. For example, for the same user, the first distribution system can use the identifier "FirstMember #1" and the second distribution system can use the identifier "SecondMember #1."

In other examples, the timestamp portion indicates when the distribution is or is to be made. In various examples, the line portion includes a value that indicates each group (e.g., demand-side entity 202, resource 212, group #1 222, group #1 & device #1 231 illustrated in FIG. 2). The value can be a random or any other arbitrary number determined by the management system. The relationships (e.g., hierarchy) of the values can be indicated by a different data structure (e.g., data structure 200 illustrated in FIG. 2).

In at least one embodiment, the management system may use at least the first distribution information and the second distribution information to generate data structure 300. To link distinct identities used by different distribution systems, the management system may use the following identity mapping:

```
{ principal1: "FirstMember#1", principal2: "FirstMember#1" }
{ principal1: "SecondMember#2", principal2: "FirstMember#2" }
{ principal1: "FirstMember#3", principal2: "SecondMember#3" }
    { principal1: "Member#1", principal2: "FirstMember#1" }
{ principal1: "FirstMember#1", principal2: "FirstMember#1" }
    { principal1: "FirstMember#2", principal2: "Member#2" }
    { principal1: "FirstMember#3", principal2: "Member#3" }
    { principal1: "FirstMember#4", principal2: "Member#4" }
    { principal1: "GoogMember#5", principal2: "Member#5" }
```

Some of the mappings (e.g., {principal1: "FirstMember #1", principal2: "FirstMember #1"}) might have a complete mapping that comprises identifiers used by different distribution systems. On the other hand, some other mappings (e.g., {principal1: "Member #1", principal2: "FirstMember #1"}) might have an incomplete mapping that requires the use of a canonical mapping (e.g., "Member #1"). Since the incomplete mapping does not include the identifiers used by at least one of the distribution systems, distributions that are associated with those identifiers won't count for the purpose of performing global frequency capping described in FIGS. 1-6.

In at least one embodiment, the data structure 300 may include distributions per user to group. Data structure 300 may include data for 5 users (e.g., member #1 321, member #2 322, member #3 323, member #4 324, member #5 325) that are associated with different groups (e.g., demand-side entity 311, resource 312, group #1 313, group #1 & device #2 314, group #2 & device #1 315, group #2 & device #2 316, group #2 & device #3 317). In some examples, demand-side entity 311 may include demand-side entity 202 illustrated in FIG. 2; resource 312 may include resource 212 illustrated in FIG. 2; group #1 313 may include group #1 222 illustrated in FIG. 2; group #1 & device #2 314 may include group #1 & device #2 232 illustrated in FIG. 2; group #2 & device #1 315 may include group #2 & device #1 233 illustrated in FIG. 2; group #2 & device #2 316 may include group #2 & device #2 234 illustrated in FIG. 2; and group #2 & device #3 317 may include group #2 & device #3 235 illustrated in FIG. 2.

Based on the data structure, the management system may determine whether the distributions violated any of the capping rules, such as:

```
{ "group" : "demand-side entity", "limit" : "10", "period" : "5D" }
  { "group" : "resource", "limit" : "7", "period" : "4D" }
   { "group" : "group#1", "limit" : "3", "period" : "2D" }
{ "group" : "group#1 & device 2", "limit" : "3", "period" : "5D" }
{ "group" : "group#2 & device 1", "limit" : "4", "period" : "1D" }
{ "group" : "group#2 & device 2", "limit" : "3", "period" : "5D" }
{ "group" : "group#1 & device 3", "limit" : "2", "period" : "1D" }
```

The capping rules may indicate that users (e.g., member #1 321, member #2 322, member #3 323, member #4 324, member #5 325) may not receive more than 10 distributions from demand-side entity 311 in a five-day period. Additionally, the capping rules may further indicate that the users may not receive more than 7 distributions of resource 312 within a four-day period. Furthermore, the capping rules may indicate that the users associated with group #1 313 may not receive more than 3 distributions of the resource within a two-day period. Moreover, the capping rules may indicate that the users associated with group #1 & device #2 314 may not receive more than 3 distributions of the resource within a five-day period. Also, the capping rules may indicate that the users associated with group #2 & device #1 315 may not receive more than 4 distributions of the resource within a day. Additionally, the capping rules may indicate that the users associated with group #2 & device #2 316 may not receive more than 5 distributions of the resource within a five-day period. Finally, the capping rules may indicate that the users associated with group #2 & device #3 317 may not receive more than 2 distributions of the resource within a day.

As a result of applying the capping rules, the management systems prevent the distribution systems by indicating them the violations. For example, for member #1 321, at timestamp 1050, a global frequency cap for group #1 313 can be put in place. At timestamp 1060, a global frequency cap for resource 312 can be then put in place. In another example, for member #4 324, at timestamp 1030, a global frequency cap for group #2 & device #3 can be then put in place.

In another example, at each point where a frequency cap is established, a indication (e.g., new suppression segment) is sent to each distribution system. One or more members or users within the indication may result in the one or more members or users being ineligible to receive any distributions. For specific groups with lower hierarchies or targets (e.g., group #1 & device 2 314, group #2 device #1 315, group #2 & device #2 316, group #2 & device #3, etc.), the relevant "line" can be ineligible for receiving distributions. For order groups with higher hierarchies (e.g., demand-side entity 311, resource 312, group #1 313, etc.), all of its descendant targeting groups can be ineligible for distribution regardless of the eligibility for groups in lower hierarchy.

For the scenario above where Member #4 and Member #1 are subject to restrictions, the computed restrictions that are delivered to the first distribution system are given by:

```
{ user="FirstMember#4", restricted="Group#2 & Device #3", expires="1020+1D" }
  { user=" FirstMember#1", restricted="Group#1", expires="1000+2D" }
  { user=" FirstMember#1", restricted="resource", expires="1000+4D" }
```

Additional computer restrictions that are delivered to the second distribution system can be given by:

```
{ user="SecondMember#2", restricted="Group#1", expires="1000+2D" }
{ user="SecondMember#1", restricted="resource", expires="1000+4D" }
```

The "expires" may indicate a duration to impose the distribution restrictions for each distribution system.

FIG. 4 illustrates an example process 400 to perform global frequency capping of multiple systems, in accordance with at least one embodiment. Although process 400 is depicted as a series of steps or operations, it will be appreciated that at least one embodiment of process 400 includes altered or reordered steps or operations, or omits certain steps or operations, except where explicitly noted or logically required, such as when an output of one step or operation is used as input for another. One or more entities described in conjunction with FIGS. 1, 2, and 7, singly or in any combination, can perform each block of process 400. For example, the one or more entities may include computer system 100, processor 112, global frequency capping engine 114, hardware accelerator 116, storage 118, first distribution system 122, second distribution system 124, first device 132, second device 134, and third device 136 illustrated in FIG. 1. The one or more entities may further include, for example, one or more of hardware and/or software described in conjunction with FIG. 1.

Various functions can be carried out by a processor executing instructions stored in memory (e.g., computer-readable, machine-readable) to perform process 400. For example, the instructions may include a computer program persistently stored on magnetic, optical, or flash media. Also, process 400 may be implemented as computer-usable instructions (e.g., macro instruction, micro-instruction) stored on computer storage media or provided by a stand-alone application, a service, or a hosted service (standalone or in combination with another hosted service).

At block 402, the one or more entities may generate a first data structure (e.g., data structure 200 illustrated in FIG. 2) for distribution systems (e.g., first distribution system 122, second distribution system 124 illustrated in FIG. 1), where the first data structure indicates the hierarchy of groups (e.g., group #1 222 vs. group #1 and device #1 231 illustrated in FIG. 2) to distribute resources from the distribution systems. The resources may include, for example, images, banners (e.g., interactive images or videos), audio, video, text, etc. that demonstrate one or more contents (e.g., communications, promotions, advertisements, campaigns, etc.). One or more demand-side entities generate the resources such that distribution systems may distribute those to the groups in behalf of the one or more demand-side entities.

In at least one embodiment, the first data structure may include one or more trees. A group may comprise a plurality of members that share a common attribute or characteristic that is defined by the distribution systems. For example, distribution systems may identify a group with members who have kids, where resources to be distributed are related to commodities for kids. A group may include members using the same device (e.g., laptop, TV, phone, tablet PC, etc.). In some examples, a group may include subsets that are associated with different devices.

In at least one embodiment, the first data structure may include values that correspond to each group. For example, a first value may indicate a group (e.g., group 222 #1 illustrated in FIG. 2) to distribute a resource, a second value may indicate another group that has a lower hierarchy (e.g., group 231 illustrated in FIG. 2), and a third value may indicate a resource (e.g., resource 212 illustrated in FIG. 2) to distribute to the first group and the second group. A fourth value may indicate a demand-side entity (e.g., demand-side entity 202 illustrated in FIG. 2), which may request the distribution of multiple resources to different distribution systems. In some examples, the values can be in numerical order. In other examples, the values can be random or any kind of arbitrary numbers. The values may correspond to "lines" described in conjunction with FIG. 3.

At block 404, the one or more entities may generate a second data structure indicating capping rules for the groups (e.g., group #2 224, group #2 and device #1 illustrated in FIG. 2), where the capping rules may limit the number of distributions that can be made to each group within a period. The number can differ for each group. For example, a group that has a higher hierarchy can have a higher number than the groups that have a lower hierarchy or vice versa. In another example, a group that is associated with one device (e.g., phone) can have a higher number than another group in the same hierarchy that is associated with another device (e.g., desktop).

In at least one embodiment, the capping rules may include time periods to measure the number of distributions. For example, the rules may indicate a capping restriction for a certain number of hours, days, or months. In another embodiment, the capping rules may further include other time periods to prevent distribution systems from distributing resources. For example, the rules may indicate that distributions to a certain group are limited for a certain number of hours, days, or months if the distributions reach the specified number in the capping rules.

At block 406, the one or more entities may generate a third data structure indicating that each member of the groups is associated with distinct identifiers used by the distribution systems. The third data structure may indicate a mapping between different identifiers usable by different systems to signal the same member. For example, a first distribution system may use identifier #1 to identify a member, and a second distribution system may use identifier #2 to identify the member. The mapping can indicate a relationship between identifier #1 and identifier #2. The third data structure can be generated based, at least in part, on cookie swapping.

At block 408, the one or more entities may obtain from each of the distribution systems information indicating distributions made to each member (e.g., member #1 321, member #2 322, member #3 323, member #4 324, member #5 325 illustrated in FIG. 3) of the groups. An example of the information is further described in conjunction with FIG. 3.

At block 410, the one or more entities may determine the number of distributions made to the groups within the period based on the third data structure and the distribution information. The determination can be shown in a table, such as data structure 300 illustrated in FIG. 3. In some examples, the one or more entities may determine number of distributions made to the groups for each member (e.g., user) to prevent overexposure of the resource to the user. Additionally, the numbers for each user that corresponds to the same group can be different, as further described in conjunction with FIG. 3.

At block 412, the one or more entities may determine whether the rules are applicable to the groups based on the first data structure, second data structure, and the number of distributions indicated in the table.

At block 414, the one or more entities may throttle the distribution of the resources. In at least one embodiment, throttling distribution may include sending indications to the distribution systems that the distributions to one or more groups violated the rule. The indications may include one or more timestamps to limit the distributions. In other examples, throttling distributions may include blocking distributions entirely for a certain period. In some examples, throttling distributions may include gradually reducing the number of distributions if the distribution frequency is close to the threshold noted in the rules. In other examples, throttling distributions may include introducing delays between distributions. Note that one or more of the operations performed in blocks 402, 404, 406, 408, 410, 412, and 414 may be performed in various orders and combinations, including in parallel.

FIG. 5 illustrates an example process 500 to prevent distribution of resources, in accordance with at least one embodiment. Although process 500 is depicted as a series of steps or operations, it will be appreciated that at least one embodiment of process 500 includes altered or reordered steps or operations, or omits certain steps or operations, except where explicitly noted or logically required, such as when an output of one step or operation is used as input for another. One or more entities described in conjunction with FIGS. 1, 2, and 7, singly or in any combination, can perform each block of process 500. For example, the one or more entities may include computer system 100, processor 112, global frequency capping engine 114, hardware accelerator 116, storage 118, first distribution system 122, second distribution system 124, first device 132, second device 134, and third device 136 illustrated in FIG. 1. The one or more entities may further include, for example, one or more of hardware and/or software described in conjunction with FIG. 1.

Various functions can be carried out by a processor executing instructions stored in memory (e.g., computer-readable, machine-readable) to perform process 500. For example, the instructions may include a computer program persistently stored on magnetic, optical, or flash media. Also, process 500 may be implemented as computer-usable instructions (e.g., macro instruction, micro-instruction) stored on computer storage media or provided by a stand-alone application, a service, or hosted service (standalone or in combination with another hosted service).

At block 502, the one or more entities may determine whether distributions of one or more resources made to the current group in the current timestamp cause distributions to the current group to exceed the threshold specified by one or more rules. In some examples, the one or more entities store historical distribution data of the current group a certain amount of previous timesteps to make the determination. If the number exceeds the threshold at block 504, process 500 may move to block 506. If the number does not exceed the threshold at block 504, process 500 may move to block 508.

At block 506, the one or more entities may prevent at least one distribution system from distributing the one or more resources to the current group. This can be done by a system (e.g., computer system 110 illustrated in FIG. 1) indicating to the at least one distribution system that the one or more rules are violated.

At block 508, the one or more entities may identify another group where distributions were made in the current timestamp. If the group is identified at block 510, process 500 may move to block 502. If the group is not identified at block 510, process 500 may move to block 502. At block 510, the one or more entities may move to the next time-stamp and repeat process 500 from block 502 with different timestamps.

In some examples, multiple instances of process 500 can be performed in parallel or sequentially, where each instance corresponds to different members (e.g., member #1 321, member #2 322, member #3 323, member #4 324, member #5 325 illustrated in FIG. 3). Note that one or more of the operations performed in blocks 502, 504, 506, 508, and 510 may be performed in various orders and combinations, including in parallel.

FIG. 6 illustrates an example process 600 to resume distribution of resources, in accordance with at least one embodiment. Although process 600 is depicted as a series of steps or operations, it will be appreciated that at least one embodiment of process 600 includes altered or reordered steps or operations, or omits certain steps or operations, except where explicitly noted or logically required, such as when an output of one step or operation is used as input for another. One or more entities described in conjunction with FIGS. 1, 2, and 7, singly or in any combination, can perform each block of process 600. For example, the one or more entities may include computer system 100, processor 112, global frequency capping engine 114, hardware accelerator 116, storage 118, first distribution system 122, second distribution system 124, first device 132, second device 134, and third device 136 illustrated in FIG. 1. The one or more entities may further include, for example, one or more of hardware and/or software described in conjunction with FIG. 1.

Various functions can be carried out by a processor executing instructions stored in memory (e.g., computer-readable, machine-readable) to perform process 600. For example, the instructions may include a computer program persistently stored on magnetic, optical, or flash media. Also, process 600 may be implemented as computer-usable instructions (e.g., macro instruction, micro-instruction) stored on computer storage media or provided by a stand-alone application, a service, or hosted service (standalone or in combination with another hosted service).

At block 602, the one or more entities may identify current group that was prevented from receiving one or more resources in current timestamp. In some examples, the current group was prevented from receiving the one or more resources also in previous timestamps. At block 604, the one or more entities may identify a rule of one or more rules for the current group to determine whether the time period has passed for preventing the distribution. If the period has passed at block 606, process 600 may move to block 608. If the period has not passed at block 606, process 600 may move to block 610.

At block 608, the one or more entities may cause distribution systems to continue distributing resources to the group. In some examples, performing block 608 may trigger performing one or more blocks of process 500 illustrated in FIG. 1.

At block 610, the one or more entities may identify another group that is prevented from receiving resources. If another group is identified at block 612, process 600 may move to block 604. If another group is not identified at block 612, process 600 may move to block 614. At block 614, the one or more entities may move to the next timestamp to perform one or more blocks of process 600 with the new timestamp.

In some examples, multiple instances of process 600 can be performed in parallel or sequentially, where each instance corresponds to different members (e.g., member #1 321, member #2 322, member #3 323, member #4 324, member #5 325 illustrated in FIG. 3). Note that one or more of the operations performed in blocks 602, 604, 606, 608, 610, and 612 may be performed in various orders and combinations, including in parallel.

Any system or apparatus feature described herein may also be provided as a method feature, and vice versa. System and/or apparatus aspects described functionally (including means-plus-function features) may be expressed alternatively in terms of their corresponding structure, such as a suitably programmed processor and associated memory. It should also be appreciated that particular combinations of the various features described and defined in any aspect of the present disclosure can be implemented, supplied, and used independently.

Any system or apparatus feature described herein can include computer programs and computer program products comprising software code adapted, when executed on a data processing apparatus, to perform any of the methods and/or embody any of the apparatus and system features described herein, including any or all of the component steps of any method. Any system or apparatus feature described herein can also include a computer or computing system (including networked or distributed systems) having an operating system that supports a computer program for carrying out any of the methods described herein and/or embodying any of the apparatus or system features described herein. Any system or apparatus feature described herein can also include computer-readable media having stored thereon any one or more of the computer programs aforesaid. Any system or apparatus feature described herein can include a signal carrying any one or more of the computer programs aforesaid.

Note that, in the context of describing disclosed embodiments, unless otherwise specified, the use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

Figure 7:
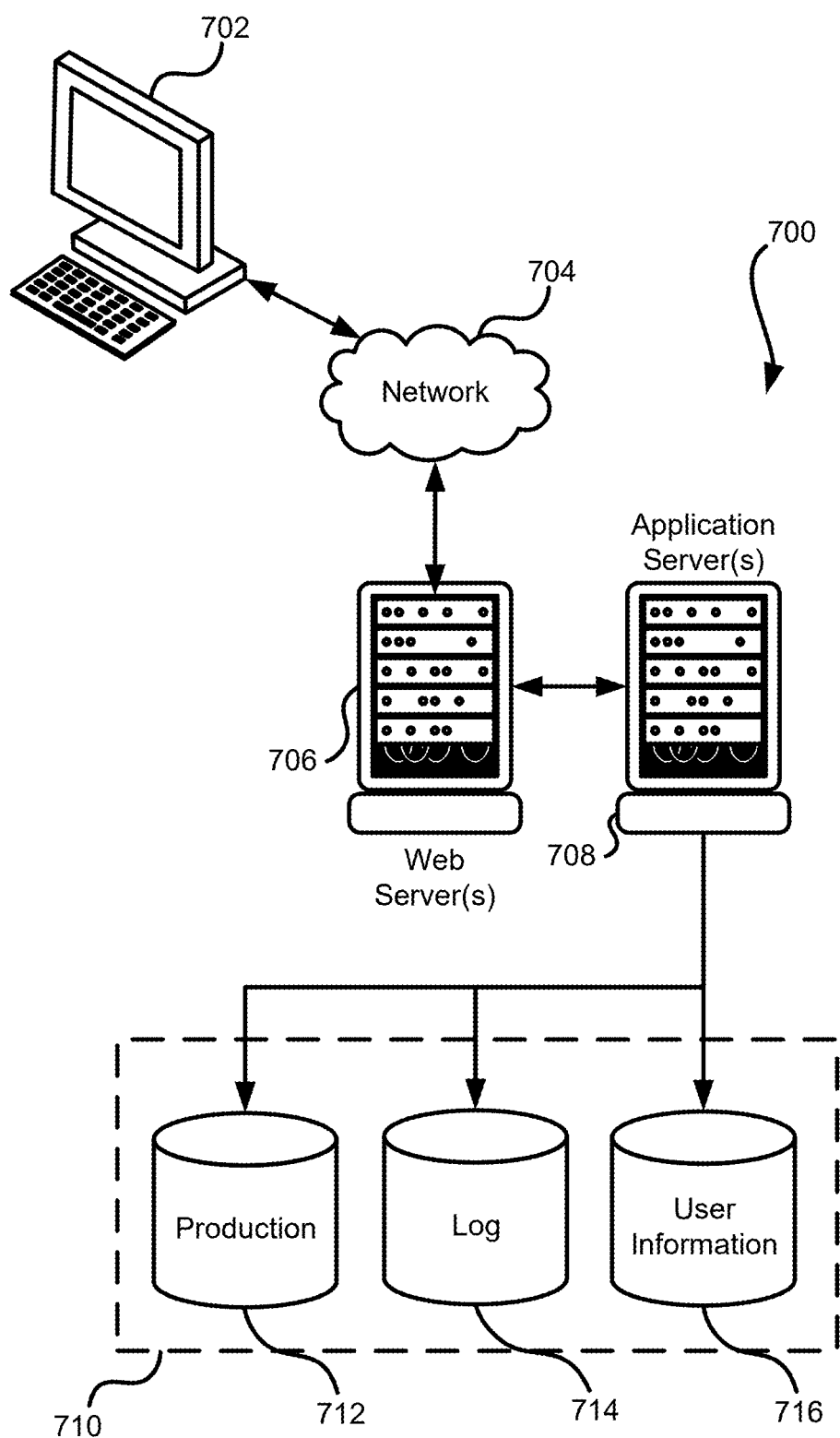
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 606 for receiving requests and serving content in response thereto, although for other networks an alternative device serving a similar purpose could be used as would be apparent to one of ordinary skill in the art.

In an embodiment, the illustrative system includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 608, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 616, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 610.

The data store 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702.

Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C#or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

At least one embodiment of the disclosure can be described in view of the following clauses:

1. A computer-implemented method, comprising:
generating two or more sets of groups to obtain a resource based, at least in part, on first information obtained from two or more independent systems that correspond to the two or more sets of groups, the resource to be presented to one or more members comprised in the two or more sets of groups by the two or more independent systems via a graphical user interface (GUI);
generating parameters that correspond to the two or more sets of groups, the parameters comprise a threshold usable to be compared with a number of times the resource is distributed to the two or more sets of groups;
obtaining, from the two or more independent systems, second information indicating one or more distributions of the resource made to two or more sets of groups;
generating a mapping between two or more identifiers that correspond to the two or more independent systems, the two or more identifiers at least indicating the one or more members;
determining a number of distributions made to the two or more sets of groups based, at least in part, on the second information and the mapping;
determining that the number of distributions made to the two or more sets of groups violates the parameters by at least comparing the number of distributions to the threshold; and
based on determining that the number of distributions made to the two or more sets of groups violates the parameters, throttling distributions of the resource from the two or more independent systems to the two or more sets of groups.

2. The computer-implemented method of clause 1, wherein throttling distributions further comprise preventing the two or more independent systems from distributing the resource within a time window.

3. The computer-implemented method of clause 1 or 2, wherein the resource comprises at least one of a image, video, or audio.

4. The computer-implemented method of any of clauses 1-3, wherein the first information comprises a hierarchy between a first group of a set of the two or more sets of groups and a second group of the set of two or more sets of groups.

5. A system, comprising:
one or more processors;
memory that stores computer-executable instructions that, if executed, cause the one or more processors to:
generate one or more thresholds to control a plurality of independent systems that distribute a resource to a plurality of groups identified by the plurality of independent systems;
determine a number of times the resource was transmitted to the plurality of groups by at least obtaining, from the plurality of independent systems, distributions executed to members associated with the plurality of groups; and
throttle distributions of the resource to at least one of the plurality of groups from at least one of the plurality of independent systems based, at least in part, on the one or more thresholds and the number of times the resource was distributed to the plurality of groups.

6. The system of clause 5, wherein the computer-executable instructions further comprise computer-executable instructions that, if executed by the one or more processors, cause the system to:
generate an association between distinct identifiers from the plurality of independent systems that indicate the members to determine the number of times.

7 The system of clause 5 or 6, wherein the computer-executable instructions that cause the system to throttle the distributions of the resource further comprise computer-executable instructions that, if executed by the one or more processors, cause the system to:

causing at least one of the plurality of independent systems from being halted from distributing the resource to at least one of the plurality of groups within a time window.

8. The system of any of clauses 5-7, wherein the one or more thresholds are associated with a value indicating a group of the plurality of groups and a type of device.

9 The system of any of clauses 5-8, wherein the one or more thresholds are associated with a processing interval to determine a number of distributions of the resource to a group of the plurality of groups.

10. The system of any of clauses 5-9, wherein the members share a common characteristic identified by the at least one of the plurality of independent systems based, at least in part, on the resource.

11. The system of any of clauses 5-10, wherein the resource comprises at least one of image, audio, or video to be displayed via a graphical user interface (GUI).

12. The system of any of clauses 5-11, wherein the one or more thresholds are associated with a graph-based architecture that comprises an hierarchy between one or more of the plurality of groups.

13. A non-transitory computer-readable storage medium storing thereon executable instructions that, as a result of being executed by one or more processors of a computer system, cause the computer system to at least:

generate a data structure associated with two or more systems that distribute a resource to two or more destinations comprising one or more recipients;

generate a set of constraints to restrict a number of distributions made to the two or more destinations;

determine a number of times the resource is distributed to the two or more destinations based, at least in part, on the data structure and distributions made to the one or more recipients; and generate an indication that at least one of the set of constraints is violated based, at least in part, on the number of times the resource is distributed.

14. The non-transitory computer-readable storage medium of clause 13, wherein the instructions further comprise instructions that, as a result of being executed by the one or more processors, cause the computer system to:

generate a link between distinct values that indicate the one or more recipients to determine the number of times.

15. The non-transitory computer-readable storage medium of clause 13 or 14, wherein the instructions further comprise instructions that, as a result of being executed by the one or more processors, cause the computer system to:

throttle distribution of the resources based, at least in part, on the number of times the resource is distributed.

16. The non-transitory computer-readable storage medium of any of clauses 13-15, wherein the instructions that cause the computer system to generate the data structure further include instructions that cause the computer system to:

generate a value that indicates at least one of the two or more destinations to determine the number of times.

17. The non-transitory computer-readable storage medium of any of clauses 13-16, wherein at least one of the set of constraints comprises the number of distributions of the resource made within a time window.

18. The non-transitory computer-readable storage medium of any of clauses 13-17, wherein the distribution of the resource is executed based, at least in part, on an indication of one or more activities performed by a device associated with at least one of the two or more destinations.

19. The non-transitory computer-readable storage medium of any of clauses 13-18, wherein the resource comprises a set of interactive images or videos to be presented via a user interface.

20. The non-transitory computer-readable storage medium of any of clauses 13-19, wherein information usable to identify a number of distributions is verified by at least using one of: decentralized systems, logs, or security assertion markup language (SAML).

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:

generating two or more sets of groups to obtain a resource based, at least in part, on first information obtained from two or more independent systems that correspond to the two or more sets of groups, the resource to be presented to one or more members comprised in the two or more sets of groups by the two or more independent systems via a graphical user interface (GUI);

generating parameters that correspond to the two or more sets of groups, the parameters comprise a threshold usable to be compared with a number of times the resource is distributed to the two or more sets of groups;

obtaining, from the two or more independent systems, second information indicating one or more distributions of the resource made to two or more sets of groups;

generating a mapping between two or more identifiers that correspond to the two or more independent systems, the two or more identifiers at least indicating the one or more members;

determining a number of distributions made to the two or more sets of groups based, at least in part, on the second information and the mapping;

determining that the number of distributions made to the two or more sets of groups violates the parameters by at least comparing the number of distributions to the threshold; and based on determining that the number of distributions made to the two or more sets of groups violates the parameters, throttling distributions of the resource from the two or more independent systems to the two or more sets of groups.

2. The computer-implemented method of claim 1, wherein throttling distributions further comprise preventing the two or more independent systems from distributing the resource within a time window.

3. The computer-implemented method of claim 1, wherein the resource comprises at least one of a image, video, or audio.

4. The computer-implemented method of claim 1, wherein the first information comprises a hierarchy between a first group of a set of the two or more sets of groups and a second group of the set of two or more sets of groups.

5. A system, comprising:

one or more processors;

memory that stores computer-executable instructions that, if executed, cause the one or more processors to:

generate one or more thresholds to control a plurality of independent systems that distribute a resource to a plurality of groups identified by the plurality of independent systems;

determine a number of times the resource was transmitted to the plurality of groups by at least obtaining, from the plurality of independent systems, distributions executed to members associated with the plurality of groups; and throttle distributions of the resource to at least one of the plurality of groups from at least one of the plurality of independent systems based, at least in part, on the one or more thresholds and the number of times the resource was distributed to the plurality of groups.

6. The system of claim 5, wherein the computer-executable instructions further comprise computer-executable instructions that, if executed by the one or more processors, cause the system to:

generate an association between distinct identifiers from the plurality of independent systems that indicate the members to determine the number of times.

7. The system of claim 5, wherein the computer-executable instructions that cause the system to throttle the distributions of the resource further comprise computer-executable instructions that, if executed by the one or more processors, cause the system to:

causing at least one of the plurality of independent systems from being halted from distributing the resource to at least one of the plurality of groups within a time window.

8. The system of claim 5, wherein the one or more thresholds are associated with a value indicating a group of the plurality of groups and a type of device.

9. The system of claim 5, wherein the one or more thresholds are associated with a processing interval to determine a number of distributions of the resource to a group of the plurality of groups.

10. The system of claim 5, wherein the members share a common characteristic identified by the at least one of the plurality of independent systems based, at least in part, on the resource.

11. The system of claim 5, wherein the resource comprises at least one of image, audio, or video to be displayed via a graphical user interface (GUI).

12. The system of claim 5, wherein the one or more thresholds are associated with a graph-based architecture that comprises an hierarchy between one or more of the plurality of groups.

13. A non-transitory computer-readable storage medium storing thereon executable instructions that, as a result of being executed by one or more processors of a computer system, cause the computer system to at least:

generate a data structure associated with two or more systems that distribute a resource to two or more destinations comprising one or more recipients;

generate a set of constraints to restrict a number of distributions made to the two or more destinations;

determine a number of times the resource is distributed to the two or more destinations based, at least in part, on the data structure and distributions made to the one or more recipients; and generate an indication that at least one of the set of constraints is violated based, at least in part, on the number of times the resource is distributed.

14. The non-transitory computer-readable storage medium of claim 13, wherein the instructions further comprise instructions that, as a result of being executed by the one or more processors, cause the computer system to:

generate a link between distinct values that indicate the one or more recipients to determine the number of times.

15. The non-transitory computer-readable storage medium of claim 13, wherein the instructions further comprise instructions that, as a result of being executed by the one or more processors, cause the computer system to:

throttle distribution of the resources based, at least in part, on the number of times the resource is distributed.

16. The non-transitory computer-readable storage medium of claim 13, wherein the instructions that cause the computer system to generate the data structure further include instructions that cause the computer system to:

generate a value that indicates at least one of the two or more destinations to determine the number of times.

17. The non-transitory computer-readable storage medium of claim 13, wherein at least one of the set of constraints comprises the number of distributions of the resource made within a time window.

18. The non-transitory computer-readable storage medium of claim 13, wherein the distribution of the resource is executed based, at least in part, on an indication of one or more activities performed by a device associated with at least one of the two or more destinations.

19. The non-transitory computer-readable storage medium of claim 13, wherein the resource comprises a set of interactive images or videos to be presented via a user interface.

20. The non-transitory computer-readable storage medium of claim 13, wherein information usable to identify a number of distributions is verified by at least using one of: decentralized systems, logs, or security assertion markup language (SAML).

*    *    *    *    *